(12) United States Patent
Geaghan

(10) Patent No.: US 8,059,103 B2
(45) Date of Patent: Nov. 15, 2011

(54) SYSTEM AND METHOD FOR DETERMINING TOUCH POSITIONS BASED ON POSITION-DEPENDENT ELECTRICAL CHARGES

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 1025 days.

(21) Appl. No.: 11/944,143

(22) Filed: Nov. 21, 2007

(65) Prior Publication Data

US 2009/0127003 A1    May 21, 2009

(51) Int. Cl.
   *G06F 3/041* (2006.01)
(52) U.S. Cl. ...................................................... 345/173
(58) Field of Classification Search .................. 345/156, 345/173, 174; 178/18.03
   See application file for complete search history.

(56) References Cited

U.S. PATENT DOCUMENTS

| | | | |
|---|---|---|---|
| 3,106,707 A | 10/1963 | Thomson | |
| 3,999,012 A | 12/1976 | Dym | |
| 4,087,625 A | 5/1978 | Dum et al. | |
| 4,263,659 A | 4/1981 | Hirata et al. | |
| 4,293,734 A | 10/1981 | Pepper | |
| 4,550,310 A | 10/1985 | Yamaguchi et al. | |
| 4,631,355 A | 12/1986 | Federico et al. | |
| 4,680,430 A | 7/1987 | Yoshikawa et al. | |
| 4,698,460 A | 10/1987 | Krein et al. | |
| 4,827,084 A | 5/1989 | Yaniv et al. | |
| 4,929,934 A | 5/1990 | Ueda et al. | |
| 4,954,823 A | 9/1990 | Binstead | |
| 5,072,076 A | 12/1991 | Camp | |
| 5,136,251 A | 8/1992 | George et al. | |
| 5,365,461 A | 11/1994 | Stein et al. | |
| 5,374,787 A | 12/1994 | Miller et al. | |
| 6,239,389 B1 | 5/2001 | Allen et al. | |
| 6,275,047 B1 | 8/2001 | Zoellick | |
| 6,466,036 B1 | 10/2002 | Philipp | |
| 6,529,017 B2 | 3/2003 | Martin et al. | |
| 7,084,860 B1 | 8/2006 | Jaeger et al. | |
| 7,157,649 B2 | 1/2007 | Hill | |
| 7,254,775 B2 | 8/2007 | Geaghan et al. | |
| 7,830,157 B2 * | 11/2010 | Geaghan | 324/678 |

(Continued)

FOREIGN PATENT DOCUMENTS

JP    60-181913    9/1985

OTHER PUBLICATIONS

U.S. Appl. No. 11/612,799, Touch Sensor with Electrode Array, filed Dec. 19, 2006.

(Continued)

*Primary Examiner* — Richard Hjerpe
*Assistant Examiner* — Jeffrey Parker
(74) *Attorney, Agent, or Firm* — Steven A. Bern

(57) ABSTRACT

Systems and methods determine the position of a touch on a surface of a device, such as a touch-sensitive device, by using position-dependent electrical charges. In such a method, the position of a touching implement is determined on the sensing surface of a device. The method includes generating signals on the surface of the device to create a position-dependent electrical charge on the touching implement; and measuring the position-dependent electrical charge to indicate a coordinate on the sensing surface for establishing the position of the touching implement.

25 Claims, 9 Drawing Sheets

U.S. PATENT DOCUMENTS

| | | |
|---|---|---|
| 7,863,909 B2 * | 1/2011 | Keith .......................... 324/678 |
| 2002/0008526 A1 | 1/2002 | Martin et al. |
| 2004/0104826 A1 * | 6/2004 | Philipp ............................ 341/34 |
| 2005/0162408 A1 | 7/2005 | Martchovsky |
| 2006/0022959 A1 * | 2/2006 | Geaghan ....................... 345/173 |
| 2006/0207806 A1 * | 9/2006 | Philipp ..................... 178/18.05 |
| 2006/0244732 A1 | 11/2006 | Geaghan |
| 2006/0279548 A1 * | 12/2006 | Geaghan ....................... 345/173 |
| 2006/0284639 A1 * | 12/2006 | Reynolds ...................... 324/765 |
| 2007/0074913 A1 | 4/2007 | Geaghan |
| 2007/0143059 A1 | 6/2007 | Moser |
| 2007/0216657 A1 | 9/2007 | Konicek |
| 2007/0257894 A1 * | 11/2007 | Philipp ......................... 345/173 |
| 2007/0291012 A1 * | 12/2007 | Chang ........................... 345/173 |
| 2008/0142281 A1 | 6/2008 | Geaghan |
| 2008/0252608 A1 | 10/2008 | Geaghan |
| 2008/0266271 A1 * | 10/2008 | Van Berkel et al. .......... 345/174 |
| 2009/0046077 A1 * | 2/2009 | Tanaka et al. ................. 345/174 |
| 2010/0127717 A1 * | 5/2010 | Cordeiro et al. ............. 324/678 |

OTHER PUBLICATIONS

U.S. Appl. No. 11/734,553, Touch Sensor with Electrode Array, filed Apr. 12, 2007.

U.S. Appl. No. 61/017,451, filed Dec. 28, 2007, entitled, "Multiple Capacitance Measuring Circuits and Methods".

* cited by examiner

SYSTEM AND METHOD FOR DETERMINING TOUCH POSITIONS BASED ON POSITION-DEPENDENT ELECTRICAL CHARGES

FIELD OF THE INVENTION

This invention relates to a system and method for determining the position of the touch of a finger or touching implement.

BACKGROUND

There are numerous approaches for sensing the location of the touch of a finger or a corded or free stylus on the surface of a touch-sensitive device, typically placed over the face of an electronic display or used as a free-standing touch tablet or off-display touch pad. Sensing methods have included resistive and capacitive sensing using resistive surface layers, as well as technology such as acoustic wave and inductive electromagnetic sensing.

Most recently, such touch-sensitive devices have been widely distributed in forms spanning various industries including but not limited to entertainment such as gaming and a wide variety of presentation-directed industries such as business and educational applications.

SUMMARY

Various aspects of the present invention are directed to systems and methods for determining the position of the touch of a finger or touching implement based on position-dependent electrical charges.

According to one aspect, the present invention is directed to a method for determining the position of a touching implement on the sensing surface of a device. The method includes generating signals on the surface of the device to create a position-dependent electrical charge on the touching implement; and measuring the position-dependent electrical charge to indicate a coordinate on the sensing surface for establishing the position of the touching implement.

According to another aspect, the present invention is directed to an apparatus for determining the position of a touching implement on the sensing surface of a device. The apparatus includes: a signal drive circuit, coupled to the surface of the device, to generate signals on the surface for creating a position-dependent electrical charge on the touching implement; and a charge measurement circuit, coupled to the surface of the device, to measure the position-dependent electrical charge for indicating a coordinate on the sensing surface for establishing the position of the touching implement.

According to yet another aspect, the invention concerns an apparatus for determining the position of a touching implement on the sensing surface of a device, with the apparatus including: a signal generation circuit to create a position-dependent electrical charge on a touching implement that has engaged an area on the sensing surface of the device; and a signal processing circuit, responsive to the position-dependent electrical charge, to locate the area on the sensing surface of the device.

In different examples, the disclosure teaches use of passive and active gradient processing, methods of adjusting parameters of a passive gradient sensor to optimize gradient magnitude for determining the position of the touching implement accurately, and a variety of touch displays and touch implements.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
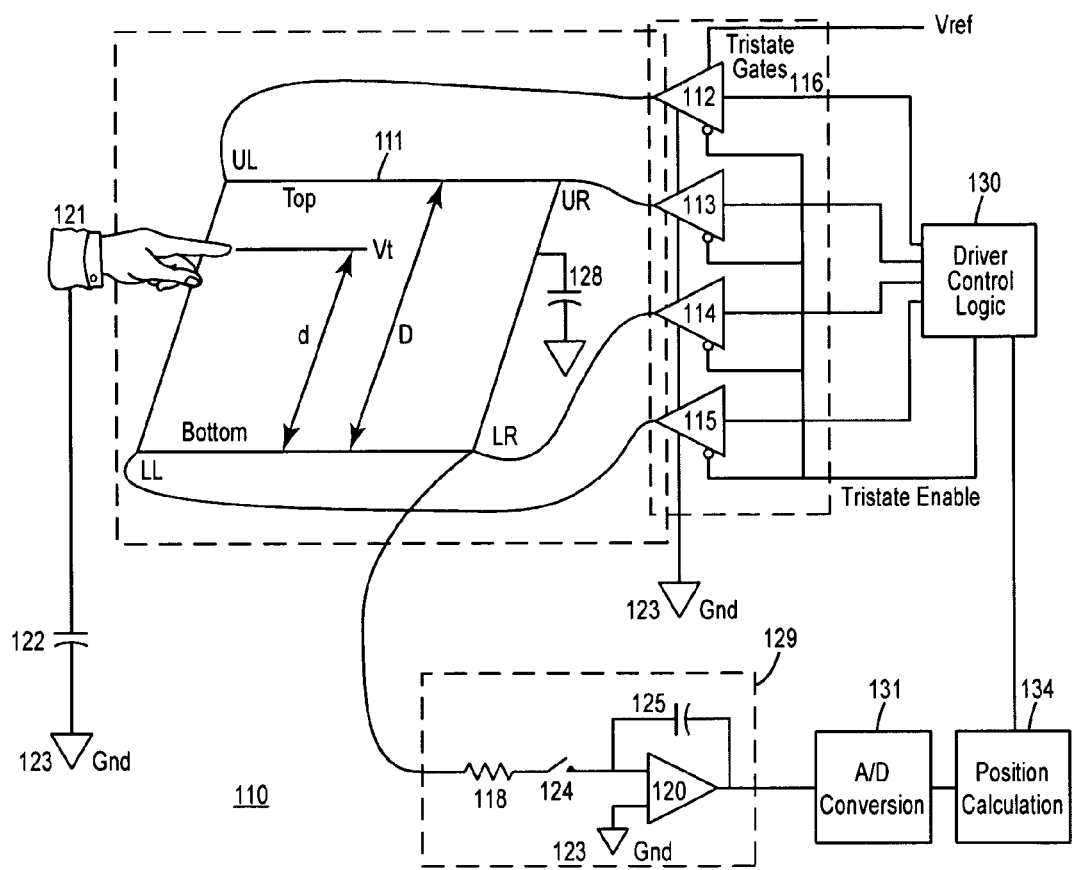
FIG. 1 illustrates a circuit arrangement for determining a touch position in accordance with an embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of systems and devices having contact-sensitive surfaces that are engaged to convey information. Various implementations of the present invention have been found to be particularly suited for locating a specific surface region (or surface coordinate) at which contact has been made. While the present invention is not necessarily limited to such implementations, various aspects of the invention may be appreciated through a discussion of various examples using this context.

The present invention relates to systems and methods for determining the position of a touching implement, such as a stylus or finger, on a sensing surface of a device. In such an application, a signal generation circuit can be used to create a position-dependent electrical charge on the touch implement that has engaged an area on the sensing surface of the device. A signal processing circuit responds to the position-dependent electrical charge by locating the area on the sensing surface of the device as indicated by the position-dependent electrical charge. In this context, certain embodiments permit for position-dependent electrical charges to respectively correspond to expected engagement areas on the sensing surface. In a related specific embodiment, the surface is a contact-alterable impedance plane that when contacted, permits the signal generation and signal processing circuits to respond to and process the position-dependent electrical charge and thereby identify the contacted surface area.

Also in accordance with the present invention, the location of the surface engagement (e.g., contact or touch) is automatically determined using at least one sensing channel as part of the signal processing circuit. For example, a specific embodiment of the present invention uses four sensing channels (e.g., one at each corner of the surface). Other specific embodiments of the present invention determine two-dimensional touch position using fewer than four sensing channels; and one such embodiment uses a single sensing channel.

FIG. 1 exemplifies a system 110 which uses an active gradient touch detection. This system 110 uses a single sensing channel, via integration circuit (or integrator) 129, to locate touches on an electrically resistive (surface) layer 111. To generate voltage gradients and current flowing in at least one direction, drive circuitry 116 includes tri-state logic drivers (112, 113, 114, and 115) to drive the resistive layer at four points, e.g., its upper and lower left and right corners UL, UR, LR and LL. The drive signals are binary, e.g., where logic high corresponds to Vref=+Vcc such as 3-5 volts, and logic low corresponds to Gnd=0 volts. The tri-state drivers are effectively used to isolate the drive circuitry and sensing surface from ground so that the common mode current can be measured and the touchpoint determined.

System 110 works by establishing a charge on the capacitance 122 of finger/body 121 where the voltage on capacitor 122 is initially proportional to the voltage Vt on sensor 111 at the point of the touch. By appropriately driving the four points and analyzing corresponding position-dependent electrical charges, locations of contact engagements can be determined, for example, in the form of X-Y Cartesian coordinates.

For a sensor having touch positions that can be identified using two-dimensional touch positions, four measurements can be used for a position calculation. Each of the measurements uses a different combination of signal levels applied. For example, where the structure is square or rectangular (e.g., sensor 111), the signal levels can be applied at the structure's corners. Table 1 shows four sequential signal combinations, referred to Sequence 1.

TABLE 1

| | Sequence 1 | | | | |
|---|---|---|---|---|---|
| Measurement | UL | UR | LL | LR | Calculate |
| X+ | 0 | +Vcc | 0 | +Vcc | |
| X− | +Vcc | 0 | +Vcc | 0 | X position |
| Y+ | +Vcc | +Vcc | 0 | 0 | |
| Y− | 0 | 0 | +Vcc | +Vcc | Y position |

With reference to FIG. 1 and Table 1, a measurement begins with the inputs of tri-state drivers 112, 113, 114, and 115 being driven by driver control logic 130 with voltages that correspond to the X+ output drive level combination shown in Table 1. The outputs of the four tri-state drivers are simultaneously enabled so that their output voltages are applied to the sensor 111. In this manner, a voltage gradient is generated on the resistive plane of the sensor 111 between the interconnect points UL, UR, LL, and LR. Current flows from the tri-state gates through the resistive plane 111 and also into the touch implement, for example, the illustrated body (or person) 121. The body 121 couples from sensor 111 to ground 123 via capacitance 122, ($C_{122}$), which becomes charged to the voltage $V_t$. The voltage $V_t$ is proportional to the voltage on the sensor 111 at the point of touch and is a function of the voltage gradient on the sensor and the distance between the touched point and the voltage drive points. During this energizing period, switch 124 is in the open state, isolating the integrator 120 from the sensor 111.

The tri-state drivers are then turned off so sensor 111 and body capacitance 122 ($C_{122}$) are electrically isolated, and the electrical charge on $C_{122}$ is held for measurement. Capacitance 122 is typically represented by two series capacitors, one capacitor coupling from the sensor surface 111 to the touching implement such as the finger, and the other capacitor coupling from the touching implement to ground 123.

After the sensor is isolated from the drive voltages, switch 124 is closed and the charge being held on the body capacitance 122 is transferred to integrator capacitor 125 through the summing junction of integrator amplifier 120. In various implementations thereof, integrator amplifier 120 and/or analog to digital conversion ("ADC") block 131 are implemented using discrete functions, and using an ADC that combines the integration and ADC functions; this can be achieved, for example, using separate integrator and ADC or the combined functions provided by a Sigma Delta type ADC. Thus, a signal proportional to the Y touch position (top to bottom) is stored on the integrator capacitor 125, resulting in the integrator output voltage $V_{INT}$.

Figure 2:
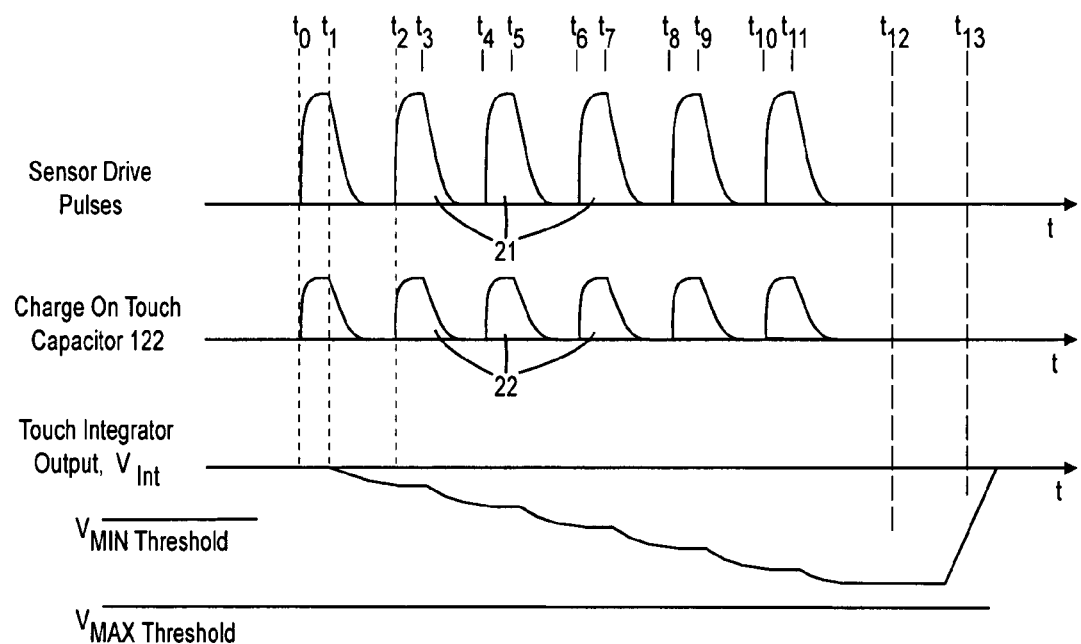
FIG. 2 illustrates a timing diagram useful for explaining the operation of FIG. 1.

The charging of capacitance 122 and charge transfer to integrator capacitor 125 may be repeated a number of times to build sufficient charge for optimal measurement (discussed further with respect to FIG. 2). The total charge accumulated by the integrator, as represented by integrator output voltage $V_{INT}$, is then measured by analog to digital conversion circuits 131, and the resulting measured value is stored for later position calculations by a processor 134. The integrator amplifier 120 can then be reset to an initial state.

FIG. 2 illustrates a few related timing plots to exemplify the signal generation and processing relative to the sensor 111 of FIG. 1. The first line of FIG. 2 shows a sequence of sensor drive pulses 21 that are applied to the sensing surface 111 by tri-state drivers 112, 113, 114, and 115. As Table 1 indicates, these pulses are applied from selected ones of the tri-state drivers while others of the drivers maintain a zero output voltage, (or in the case of passive gradients, other tri-state drivers may be off). Six pulses are shown in FIG. 2, although the number of pulses applied to the sensing surface may vary to achieve a desired voltage output, or voltage threshold, or voltage range from the integrator 120.

The second line of FIG. 2 shows the corresponding charge on touch capacitor 122.

The third line of FIG. 2 shows an example measurement sequence whereby the charge and discharge periods are integrated to yield a voltage that is then measured. Alternatively, a measurement may be performed over a fixed range of $V_{INT}$ with a variable number of charge-discharge cycles; for example, the capacitor 125 in FIG. 1 may be charged until its voltage reaches a predetermined threshold voltage.

In the example of FIG. 2, the charging periods include the time periods from $t_0$ to $t_1$ and from $t_2$ to $t_3$, for example, and the discharging periods include the time periods from $t_1$ to $t_2$ and from $t_3$ to $t_4$, for example. At time $t_{12}$, the voltage at the output of the integrator 120 ($V_{Int}$) is measured by analog to digital conversion circuit 131. At time $t_{13}$, the integrator 120 is returned to an initial state.

This sequence results in measurement of X+, which is one of four time-sequential samples used to calculate position, according to one embodiment. Subsequently, other samples are measured using the same charge/isolate/discharge process, with sensor drive states as shown in Table 1 to get additional values required for position calculation.

The maximum pulse rate (minimum period of t1–t0 and t2–t1) is limited by the charge and discharge rates (time constants) of charge pulses 21. Typically, four to six time constants are required to achieve good measurement accuracy. Time constants of pulses 22 vary with the impedance of drivers 112 through 115 and sensor 111, touch capacitance 122, and parasitic capacitance 128. As the sum of capacitances 122 and 128 (=to TCap) increase, the charge per pulse transferred to integrator 129 increases and the number of measured pulses required to reach a given output voltage $V_{Int}$ decreases.

The measurement channel, and its integrator 129, may be kept within desired operating range by using an algorithm that changes the number of sensor drive pulses in each sequence to yield a desired level or range of $V_{Int}$, based on the measured $V_{Int}$ level of the previous sequence. The effect of this algorithmic processing is that the number of pulses per sequence changes inversely with the magnitude of TCap.

The allowed charge time Tc=(t1–t0) and discharge time Td=(t2–t1) should be sufficient to allow full charging and discharging. This can be accomplished by setting Tc and Td times sufficient for the maximum possible capacitance, or preferably, Tc and Td may be varied in proportion with the magnitude of TCap. This may be done by augmenting the algorithm such that the width (Tc+Td) of drive pulses is varied inversely with the number of pulses per sequence. In addition, minimum and maximum values of Tc and Td may be pre-established based on known system parameters including minimum and maximum levels of TCap, sensor impedance, and driver impedance. Alternatively, Tc and Td may be established through a calibration procedure.

The width (Tc+Td) of the drive pulse periods may be varied inversely with the quantity of pulses, and thus the elapsed time of sensor pulsing remains approximately constant. The effect is that overall integration rate can be optimized to provide the data rate and accuracy needed while minimizing power, and the data rate remains constant with varying magnitudes of touch capacitance. This PWM method is useful with all active gradient systems, but may not be used with passive gradient systems where pulse width is matched to sensor impedance.

The following algorithm, which is referred to as "Algorithm 1" exemplifies this above-discussed approach.
1. Prior to use, parameters are pre-set so $V_{INT}$ is in the mid-range between $V_{MIN}$ and $V_{MAX}$ at the end of each integration period ($t_{12}$). This may be done by calculation, or by experimental calibration. Pre-set parameters may include:
   a. Pulse rise time (t1–t0)
   b. Pulse period (t2–t0)
   c. Number of pulses (N) in each integration period.
   d. X=% change per adjustment 2. During use, the following measurement sequence is repeated:
   a. $V_{INT} < V_{MIN}$?
      i. YES: Increase Pulse period by X % and reduce pulse count N by X %, then Go to d.
      ii. NO: Go to b.
   b. $V_{INT} > V_{MAX}$?
      i. YES: Reduce Pulse period by X % and increase pulse count N by X %, then Go to d.
      ii. NO: Go to c.
   c. Report measured $V_{INT}$.
   d. Reset integrator 129
   e. Start a new measurement, using new Pulse period and pulse count.

When all four measurements (X+, X−, Y+, Y−) are completed, the measurements can be used in a position calculation to determine the touch coordinates. First, baseline (no-touch) levels of all measurements are subtracted from current measurements to determine changes using the following equations to determine the Cartesian coordinates of the touch, Xt and Yt:

$$Xt = (X+)/((X+)+(X-)), \qquad \text{(Equation 1)}$$

$$Yt = (Y+)/((Y+)+(Y-)), \qquad \text{(Equation 2)}$$

The desired result is to identify the position of the touch, $X_t$ and $Y_t$, as a ratio of total screen length in the dimension of interest. Referring to the vertical measurement in Equation 2 as an example, the voltage on touch capacitance 122 is initially proportional to the voltage on sensor 111 at the point of touch $V_t$. When the charge on capacitance 122 is transferred to integrator capacitor 125, the resulting voltage $V_{Tint}$ is as shown in the equations below (e.g., Equation 14).

To measure the vertical position, Y+ may first be measured (with +Vcc applied to the top corners of the sensor, and the bottom corners switched to ground 123). This results in the integrator output $V_{Int}$ having a value of Y+. A second measurement may be made with +Vcc applied to the bottom corners, resulting in the measurement Y−. Alternatively, a third measurement, TCap could be made with +Vcc applied to all 4 corners of a sensor. If voltage gradients across the sensor are uniform during the measurement of Y+ and Y−, then TCap=(Y+)+(Y−) and also TCap=(X+)+(X−).

The desired output of the system is d/D, where D is sensor length in the dimension of interest (in the case of Y, the sensor height) and d is touch distance from an edge of the sensor (in the case of Y, the bottom of the sensor). By geometry, the following relationships apply:

$$Y+ = Vcc*(d/D) \qquad \text{(Equation 3)}$$

$$Y- = Vcc*(D-d)/D. \qquad \text{(Equation 4)}$$

Solving equations (3) and (4), we get d/D in terms of Y+ and Y− as follows:

$$Vcc = Y-*D/(D-d) \qquad \text{(Equation 5)}$$

$$Y+ = Y-*[D/(D-d)]*(d/D) \qquad \text{(Equation 6)}$$

Rearranging these terms yields the following relationship:

$$\text{Position} = Y = d/D = Y+/((Y+)+(Y-)) \qquad \text{(Equation 7)}$$

Moreover, since $$TCap = (Y+)+(Y-) \qquad \text{(Equation 8)}$$

an alternative position calculation is:

$$\text{Position} = Y = d/D = (Y+)/(TCap) \qquad \text{(Equation 9)}$$

It is important that the position calculations yield accurate results independent of the magnitude of touch capacitance 122, since 122 is dependent on the surface area of a touching finger and size of the person touching, and other environmental variables. The following equations show that position can be calculated independent of the magnitude of capacitance 122, provided that capacitance 122 remains substantially constant during the period while a set of Y+ and Y− or X+ and X− measurements are made.

Charge on capacitance 122 ($C_{122}$) is transferred to integrator capacitor 125 ($C_{125}$) and the resulting voltage on $C_{125}$ is proportional to the ratio of $C_{125}/C_{122}$, therefore:

$$qt = k\, C_{122} V_t \quad \text{(Equation 10)}$$

where $V_t$ is voltage at the touch point, q=charge on the capacitor, and k is a constant.

$$qi = k\, C_{125} V_{INT} \quad \text{(Equation 11)}$$

where $V_{Tint}$=Integrator output corresponding to $V_t$. When charge is transferred 100% from finger to integrator, qt=qi, and thus:

$$k\, Ct\, Vt = k\, C_{125} V_{Int} \quad \text{(Equation 12)}$$

$$C_{122} * V_t = C_{125} V_{Int} \quad \text{(Equation 13)}$$

$$V_{Tint} = V_t * (C_{125}/C_{122}) = X+, X-, Y+, \text{ or } Y-, \text{ depending on sensor drive used} \quad \text{(Equation 14)}$$

Accordingly, if:

$$\text{Position} = d/D = Y+/((Y+)+(Y-)). \quad \text{(Equation 15)}$$

then:

$$\text{Position} = V_{IntY+} * (C_{122}/C_{125})/(V_{IntY+} * (C_{122}/C_{125}) + V_{IntY-} * (C_{122}/C_{125})) \quad \text{(Equation 16)}$$

and:

$$\text{Position} = Y+/((Y+)+(Y-)) \quad \text{(Equation 17)}$$

Thus, $C_{122}$ drops out of the equation and the measurement is shown to be independent of the magnitude of the touch capacitance.

The position calculation equations above yield accurate results if the magnitude of total touch capacitance 122 remains constant during the sampling of each X+ and X− pair, and Y+ and Y− pair. However, measuring X+ with a different magnitude of touch capacitance 122 from the corresponding X− measurement will result in an apparent shift in the X position.

Each of the capacitance measurements discussed above will include parasitic capacitance coupling all parts of the sensor to ground, which is present in the system at all times whether the sensor is being touched or not. The effects of parasitic capacitance are eliminated by measuring baselines for all parameters (X+, X−, Y+, Y−) when there is no touch on the sensor. These no-touch capacitance values are subtracted from all subsequent measurements to eliminate the effects of the constant parasitic capacitance. The discussions of capacitance measurement in this patent application assume that baseline parasitic capacitance is subtracted from all capacitance measurements.

$$X+ = (X+_{NEW} - X+_{BASELINE}) \quad \text{(Equation 18)}$$

$$Y+ = (Y+_{NEW} - Y+_{BASELINE}) \quad \text{(Equation 19)}$$

The presence or absence of a touch is determined prior to measuring a position, and magnitude of total touch capacitance should preferably be known if any adjustment due to automatic gain control or pulse width modulation is to be performed as discussed later in this document. Total capacitance (TCap) can be calculated from the measurements [(X+)+(X−)] or from [(Y+)+(Y−)], or TCap may be measured directly by driving all sensor interconnect points with the same signal as shown below. Thus, the four-step measurement sequence shown in Table 1 may be modified to a three-step measurement sequence shown in Table 2.

TABLE 2

| | Sequence 2 | | | |
|---|---|---|---|---|
| Measurement | UL | UR | LL | LR |
| TCap | +Vcc | +Vcc | +Vcc | +Vcc |
| X+ | 0 | +Vcc | 0 | +Vcc |
| Y+ | +Vcc | +Vcc | 0 | 0 |

According to another embodiment of the present invention, the TCap measurement is done by driving all surface drive points (e.g., four corners as in the case of the example of FIG. 1) of the sensor rather than driving a voltage gradient across the sensor. The result of this measurement is a direct measurement of total capacitance (TCap) which, for a single layer sensor, is equal to [(X+)+(X−)], which is also equal to [(Y+)+(Y−)].

Table 3 shows an example where TCap is measured repeatedly and a test is made after each measurement to determine if a touch is present. Thus, presence of a touch and touch capacitance magnitude can be determined with one measurement (TCap) rather than two measurements (X+ and X−, or Y+ and Y− as discussed above). This can allow for relatively fast touch detection.

TABLE 3

| | | Sequence 3 | | | | |
|---|---|---|---|---|---|---|
| Time | Measurement | UL | UR | LL | LR | Calculate |
| t1 | TCap1 | +Vcc | +Vcc | +Vcc | +Vcc | Touch = No |
| t2 | TCap2 | +Vcc | +Vcc | +Vcc | +Vcc | Touch = No |
| t3 | TCap3 | +Vcc | +Vcc | +Vcc | +Vcc | Touch = Yes |
| t4 | X+ | 0 | +Vcc | 0 | +Vcc | Xt4 = (X+)/(TCap3) |
| t5 | Y+ | +Vcc | +Vcc | 0 | 0 | Yt5 = (Y+)/(TCap3) |
| t6 | TCap4 | +Vcc | +Vcc | +Vcc | +Vcc | Yt6 = (Y+)/(TCap4) |
| t7 | X+ | 0 | +Vcc | 0 | +Vcc | Xt7 = (X+)/(TCap4) |

Once a touchdown has been detected (at t3) using the above method, TCap measurements can be alternated with X+ and Y+ measurements to determine touch location using Equations 20 and 21.

$$Y = (Y+)/(TCap) \quad \text{(Equation 20)}$$

$$X = (X+)/(TCap) \quad \text{(Equation 21)}$$

After the initial touchdown detection at t3, an X+ measurement in combination with the prior TCap measurement allows calculation of X position at t4. At t5, Y+ is measured and Yt5 position can be calculated and a first X,Y position can be reported. Subsequently TCap 4 can be measured at t6, and an updated Yt6 position can be calculated. Then X+ may be measured at t7 and an updated Xt7 can be calculated, etc.

In the presence of low frequency noise, and/or when the magnitude of touch capacitance is varying with time, the time difference between samples of X+, Y+ and TCap are preferably minimized. This may be accomplished by adding a second (and/or third, etc.) measurement circuit and alternating samples between the measurement circuits.

As noted above, position calculation equations above yield accurate results only if the input parameters (TCap, X+, X−, Y+, Y−) that are used in each $X_t$ or $Y_t$ calculation equation are measured with the same touch capacitance and the same level of noise. This would ideally be achieved by measuring X+ (or Y+) and TCap simultaneously, but may alternatively be approximated by mathematically simulating simultaneous measurement by interpolation between sequential parameter measurements.

For example, when a touch has been detected, Sequence 3 (as presented above with Table 3) can be used with interpolation to increase accuracy. In this case, the interpolation formula is:

$$Xt4=(X+)/((2*TCap3+TCap4)/3), \quad \text{(Equation 22)}$$

$$Yt5=(Y+)/((TCap3+2*TCap4)/3). \quad \text{(Equation 23)}$$

An alternative Sequence 4 may be used where accuracy is more important than data rate. Sequence 4=[TCap1; X+; TCap2; Y+; TCap3; X+; TCap4; Y+], etc. minimizes the time lapse between an X+ or Y+ measurement and its associated TCap measurements by bracketing each X+ or Y+ with two adjacent TCap measurements. For the example Sequence 4, coordinates may be calculated using the formula:

$$Xt=(X+)/((TCap1+TCap2)/2), \text{ then} \quad \text{(Equation 24)}$$

$$Yt=(Y+)/((TCap2+TCap3)/2), \text{ etc.} \quad \text{(Equation 25)}$$

This linear interpolation of before-and-after TCap values results in an averaged TCap which is in effect simultaneous with the X+ measurement. This interpolated value of TCap for X/Y calculations can remove most of the effects of changing touch capacitance and some low frequency noise effects during X or Y measurements. This is based on the assumption that touch capacitance varies linearly vs. time between TCap measurements.

The system can select among the measurement/calculation modes above to provide optimal measurement for all conditions. For example, during no-touch, a sequence of [TCap; TCap; TCap] measurements can detect touch or pen proximity at lowest power and fastest determination of touch magnitude, as shown in Table 3. During the initial touchdown transition, Sequence 3 (with Equations 20 and 21) can achieve the fastest initial position measurement (e.g., X and Y can be calculated at t5). Sequence 3 plus temporal interpolation (Equations 22 and 23) may achieve improved accuracy during continuous touch and/or stroke motions, where low frequency ambient noise and varying capacitance (TCap) are a factor. Sequence 4 can achieve the best accuracy during continuous touch, where ambient noise and varying TCap are more important than fast data rate.

Figure 3:
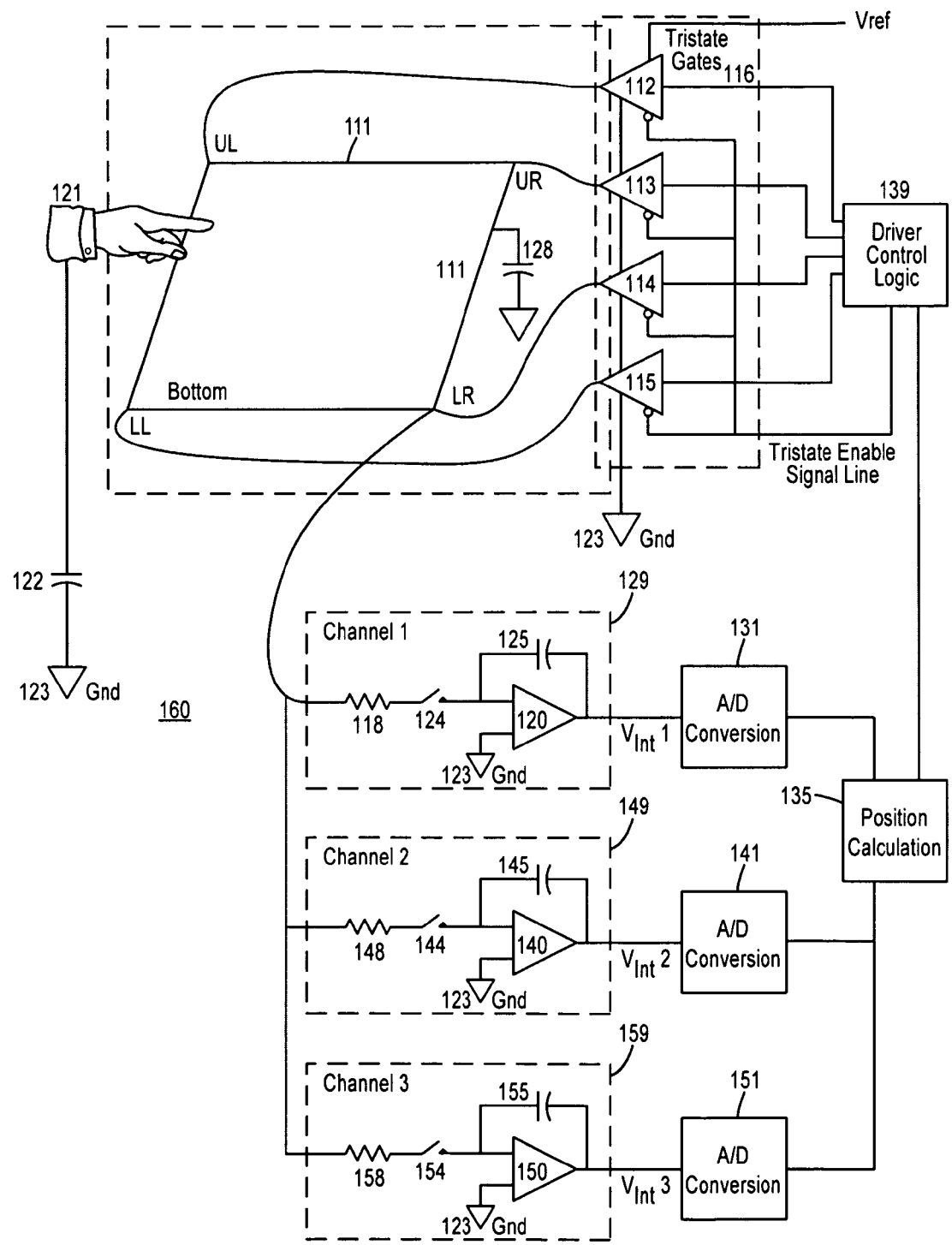
FIG. 3 illustrates another circuit arrangement for determining a touch position, with the circuit configured to drive signals on a sensing surface, also in accordance with an embodiment of the present invention.

Effects of noise and changing touch capacitance can be further mitigated by using multiple measurement circuits, for example, as shown in the system 160 of FIG. 3. The system 160 relates to the system of FIG. 1 in terms of structure and operation, with some notable differences. One such difference is that the system 160 of FIG. 3 is configured to sequence through the parameters being measured. For example, measurement Channels 1 and 2 of the system 160 can be used alternately so that one pulse of TCap is measured on Channel 1, then one pulse of X+ is measured on Channel 2, etc.

Figure 3A:
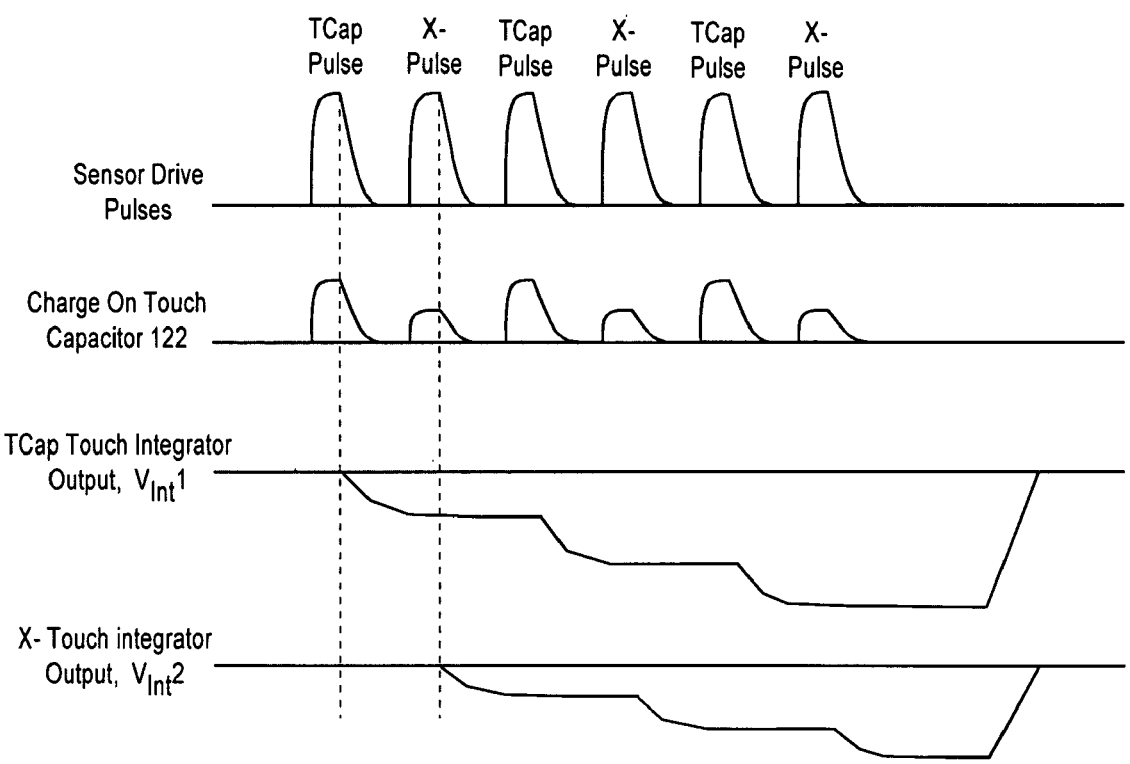
FIG. 3A illustrates a timing diagram useful for explaining the operation of FIG. 3.

In connection therewith, FIG. 3A shows a series of three TCap pulses interleaved with three X+ (or X−) pulses, and with the resulting integrator outputs $V_{Int}1$ and $V_{Int}2$. This interleaved sampling overlaps portions of the TCap and X+ signal measurements so they are effectively simultaneous. Changes in capacitance 122 at a rate less than the sampling rate of X+ and TCap are significantly reduced. Noise with frequency less than the sampling rate of X+ and TCap is also reduced. Temporal interpolation (as described above) is not as important if interleaved sampling is used.

The system 160 of FIG. 3 is also configured with an optional measurement Channel 3. This measurement Channel 3 can be used so that, for example, pulses of TCap can be measured on Channel 1, X+ can be measured on Channel 2, and Y+ can be measured on Channel 3, and thus pulses of TCap, X+, and Y+ are measured sequentially. This results in pseudo-simultaneous (temporally interleaved) measurement of X and Y dimensions with improved low frequency noise immunity, and improved accuracy during fast stroke movements.

Figure 4:
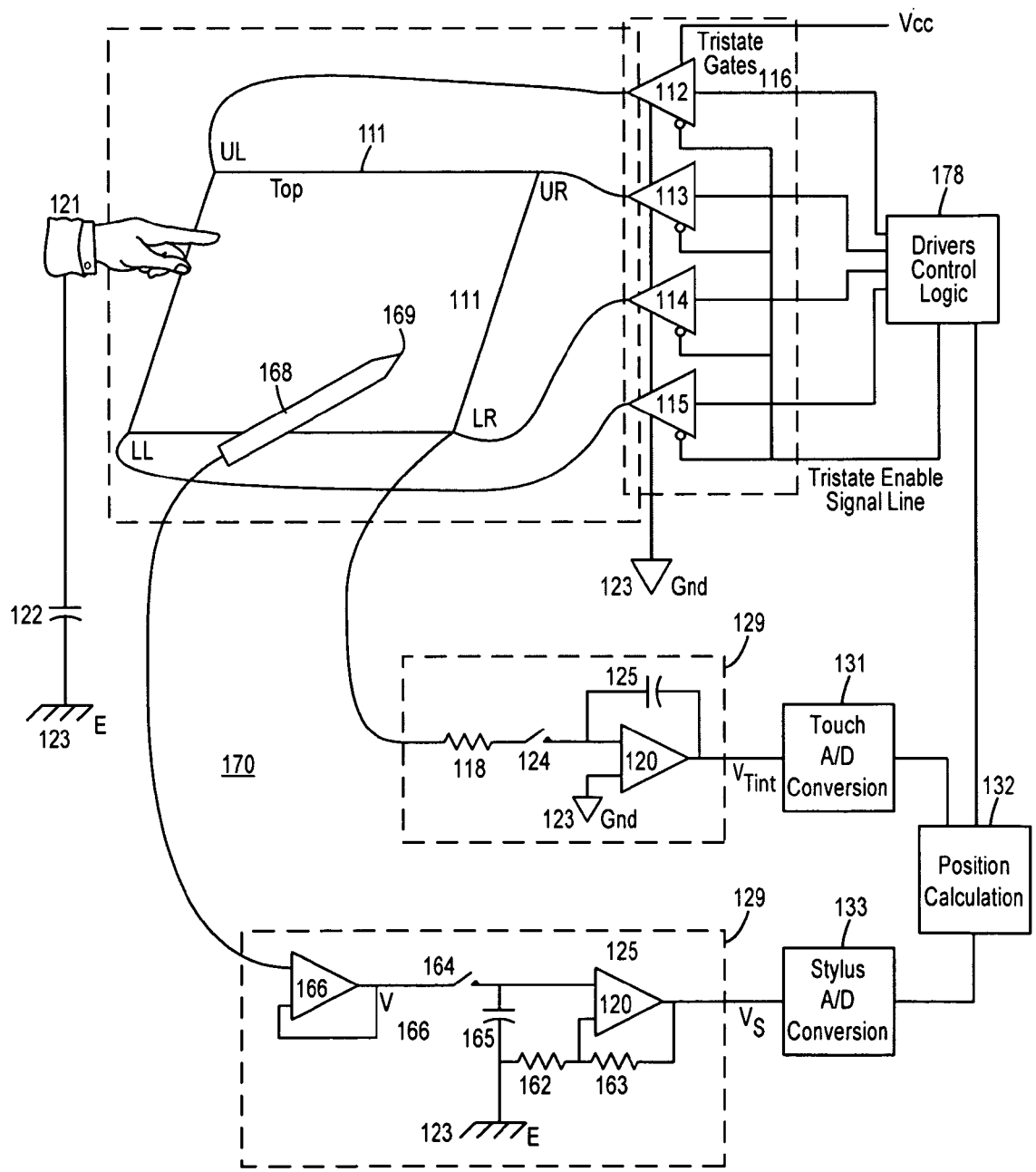
FIG. 4 illustrates yet another circuit arrangement for determining a contact position on a surface, also in accordance with an embodiment of the present invention, with the circuit configured to detect touch and stylus position simultaneously.

The alternative configuration of FIG. 4 has two types of location measurement channels; a single touch-location measurement channel 129 and a measurement channel 179 for sensing the location of a stylus touching or near the surface. In certain specific embodiments of the present invention, the same sensor drive signals can provide for simultaneous measurement of touch and (tethered) stylus position. In this context, FIG. 4 shows a touch and stylus position measurement system 170, with the touch-only system 110 of FIG. 1 plus the blocks 179 and 133 for measuring stylus voltage and for its analog to digital conversion. Thus, these measurement channels, for touch position and stylus position, connect to a position calculation processor which calculates both touch and stylus position.

When X+, X−, Y+, and Y− signals are being applied to the sensor 111 for touch position detection as described herein, the stylus voltage measurement system measures voltages which couple from sensor 111 to the tip 169 of stylus 168.

Figure 5:
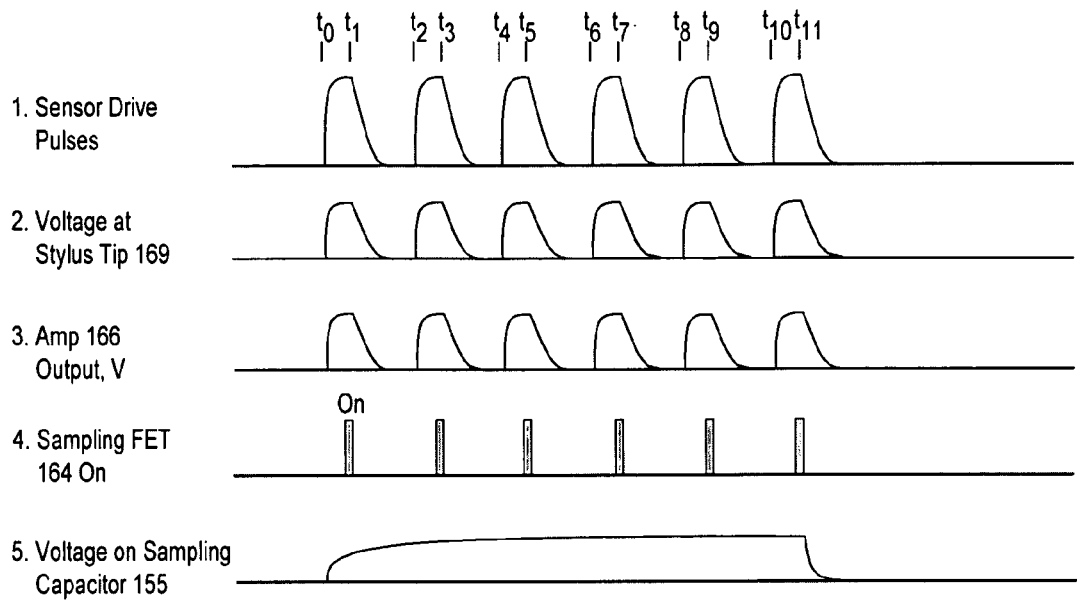
FIG. 5 illustrates measurement waveforms useful for explaining the configuration of FIG. 4.
Figure 6:
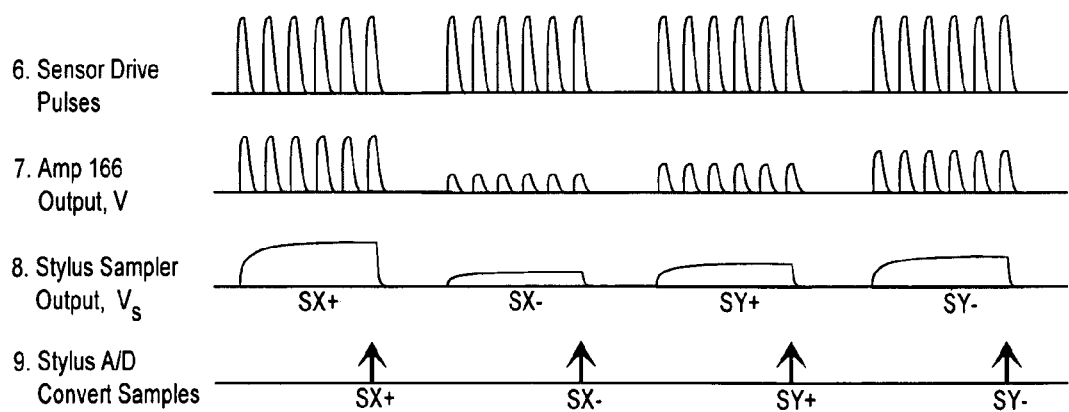
FIG. 6 illustrates measurement waveforms useful for explaining the configuration of FIG. 4.

With reference to the circuit diagram of FIG. 4, FIGS. 5 and 6 illustrate the stylus waveform timing at certain nodes relative to sensor drive pulses as shown in line 1 of FIG. 2 and reproduced in line 1 of FIG. 5. Line 6 of FIG. 6 shows these pulses being reapplied over a larger time scale. Lines 2 and 3 of FIG. 5 show that these sensor drive pulses are measured at the tip 169 of stylus 168 by high impedance buffer amplifier 166, and transferred to the sampling circuit comprising switch 164, holding capacitor 165, and buffer amplifier 161 with resistors 162 and 163 for voltage dividing feedback. Line 7 shows the output of amplifier 166 on the same time scale as line 6 of FIG. 6. Line 4 of FIG. 5 indicates that the switch (e.g., FET-based circuit) 164 is turned on after each sensor drive pulse reaches its maximum magnitude. The voltage on the sampling capacitor 165 (block 179) is shown in line 5 of FIG. 5, with the peak value of the sampled pulses held at the sampling capacitor 165 until it is processed and sampled; lines 8 and 9 of FIG. 6 show this processing at the respective input and output of the stylus analog to digital converter 133. It is appreciated that the capacitor 165 sampling circuit could be replaced by an integrating circuit similar to circuits 126.

In this way the voltage at the stylus tip is measured while sensor 111 is driven in each of the states of Sequence 1 (Table 1) or Sequence 2 (Table 2). Position of the stylus tip may then be calculated from the equations:

$$Xs=(SX+)/((SX+)+(SX-)), \quad \text{(Stylus equation A)}$$

$$Ys=(SY+)/((SY+)+(SY-)). \quad \text{(Stylus equation B)}$$

The derivation of these equations follows the same logic as that for touch capacitance. Measurement of voltage detected at the stylus tip location is analogous to measurement of charge on capacitance 122 at the touch location, though the mechanism for stylus measurement includes buffer amp 156 and sampler circuits 154, 151, 155 rather than an integrator.

The input impedance of stylus 168 and amp 166 are preferably high, with minimal parasitic capacitance to ground. For example, 10M ohms of resistance and 1 pf of capacitance are acceptable values, though the lowest possible capacitance is preferred, especially where capacitance from a sensor to a stylus tip is small.

Alternatively, stylus sensing may be accomplished with a three-sample sequence of measurements where the sensor is driven with signals shown in Table 2 or Table 3, and stylus measurements SX+, SY+, SCap are made corresponding to the touch measurements of X+, Y+, and TCap. Stylus position can then be calculated using the same equations as were used for touch.

As an alternative to an interleaved configuration, the parameter measured by each of the channels can be switched on alternating measurement cycles, and results can be averaged to obviate the benefits of matching the measurement channels as with FIG. 3.

This alternative approach is illustrated with reference to Table 4. During a first measurement, (M#1) TCap is measured by channel 1, X+ is measured by channel 2, and Y+ is measured by Channel 3; and X,Y position 1 can be calculated. During the next measurement (M#2), Y+ is measured by channel 1, TCap is measured by channel 2, and X+ is measured by Channel 3; and X,Y position 2 can be calculated. During the next measurement (M#3), X+ is measured by channel 1, Y+ is measured by channel 2, and TCap is measured by Channel 3; and X,Y position 3 can be calculated. Positions 1, 2, and 3 can then be averaged together to yield a position that is not affected by differences among channels 1, 2, and 3, and all subsequent measurements during a touch can be averaged in triplets, (or multiple triplets) to obviate the effects of channel mismatch. Initial touchdown positions P1 and P2 can also be used, provided any differences among channels 1, 2, and 3 are of reasonable magnitude, for example, within 5% matching.

TABLE 4

Alternating and Averaging Channels in System of FIG. 3

| Measurement | Ch 1 | Ch 2 | Ch 3 | Touch Result |
|---|---|---|---|---|
| M#1 | TCap | X+ | Y+ | P1 = Position 1 = Calculate X, Y (Eqs 20 and 21) |
| M#2 | Y+ | TCap | X+ | P2 = Calc X, Y & average with P1 position |
| M#3 | X+ | Y+ | TCap | P3 = Calc X, Y & average with P1 & P2 positions |
| M#4 | TCap | X+ | Y+ | P4 = Calc X, Y & average with P2 & P3 positions |
| M#5 | Y+ | TCap | X+ | P5 = Calc X, Y & average with P3 & P4 positions |
| M#6 | X+ | Y+ | TCap | P6 = Calc X, Y & average with P4 & P5 positions |

Figure 8:
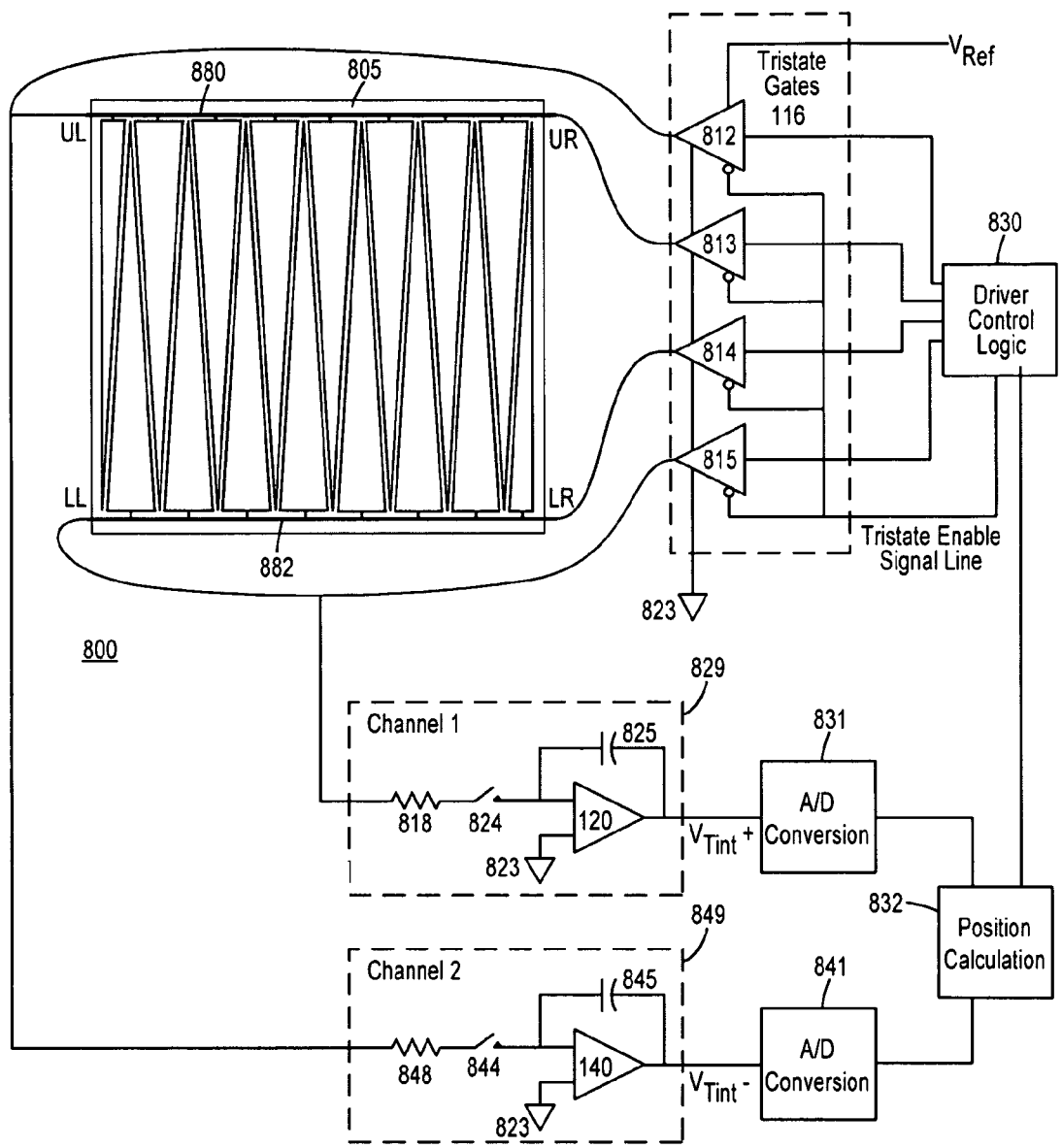
FIG. 8 illustrates another circuit arrangement for determining a touch position also in accordance with an embodiment of the present invention.

FIG. 8 is a diagram of a touch position arrangement 800 including a hybrid sensor 805 and gradient-drive electronics, with the system generating gradients in one (e.g., X) direction only. Two charge measurement channels are used, and the Y dimension is determined by calculating the ratio of charge measured by Channel 1 versus that measured by Channel 2.

Hybrid sensor 805 has two sets of wedge shaped electrodes as described in co-pending patent application Ser. No. 11/612,799. The top set of electrodes is connected to distributed points along resistive bar 880, which has resistance of 1K to 200K ohms between points UL and UR. The bottom set of electrodes is connected to distributed points along resistive bar 882, which has resistance equal to bar 880 between points LL and LR. Tri-state drivers 812 and 815 operate synchronously in Isolated, High output, or Low output mode as shown in Table 5. Drivers 813 and 814 also operate synchronously to generate gradients horizontally across resistive bars 880 and 882. Operation is similar to previously discussed methods, whereby voltages are applied to corners of sensor 805, then the voltage-applying circuits are simultaneously electrically isolated from sensor 805 and the electrical charge remaining on sensor 805 is measured. In the hybrid case, two different electrical charges remain on sensor 805 because upper electrodes and bar 880 are electrically isolated from the lower electrodes and bar 882. In this example, two charge measuring circuits 829 and 849 may be used to measure the two charge levels by closing switches 824 and 844 immediately after drivers 812 through 815 are isolated.

An example sequence is shown below in Table 5, where TCap and sequences are run, and Channels 1 and 2 integrate the charge deposited on the top and bottom electrodes of sensor 805. Total charge measured by integrators 829 and 849 is QB and QT respectively, and the total change in charge (from the no-touch state) is $\Delta QB$ and $\Delta QT$, respectively. Integration may include one or more charge-discharge cycles of sensor 805, and integration may be performed over a fixed number of charge-discharge cycles or integration may be done over a fixed range of $V_{Int}$, with a variable integration time. During periods of non-touch, a base level of charge QT and QB is established. A sufficient change $\Delta QT$ or $\Delta QB$ from the base level during a TCap or X+ measurement cycle indicates a touch. During a Touch state, TCap cycles and/or X+ cycles are run, $\Delta QT$ and $\Delta QB$ are measured, and X and Y can be calculated using the following:

$$TCap = \Delta QT + \Delta QB \quad \text{(Equation 26)}$$

$$X = (\Delta QB + \Delta QT)/TCap \quad \text{(Equation 27)}$$

$$Y = \Delta QT/\Delta QB \quad \text{(Equation 28)}$$

TABLE 5

Sequence 5

| Time | Measurement | UL | UR | LL | LR | Calculate |
|---|---|---|---|---|---|---|
| t1 | TCap1 | +Vcc | +Vcc | +Vcc | +Vcc | Touch = No; TCap1 < Threshold |
| t2 | TCap2 | +Vcc | +Vcc | +Vcc | +Vcc | Touch = No; TCap2 < Threshold |
| t3 | TCap3 | +Vcc | +Vcc | +Vcc | +Vcc | Touch = Yes; TCap3 > Threshold Yt3 = $\Delta QT/\Delta QB$ |
| t4 | X+ | 0 | +Vcc | 0 | +Vcc | Xt4 = $(\Delta QB + \Delta QT)/(TCap3)$, Yt4 = $\Delta QT/\Delta QB$ |
| t5 | TCap5 | +Vcc | +Vcc | +Vcc | +Vcc | Xt5 = $(\Delta QB + \Delta QT)/(TCap5)$, Yt5 = $\Delta QT/\Delta QB$ |

TABLE 5-continued

Sequence 5

| Time | Measurement | UL | UR | LL | LR | Calculate |
|------|-------------|-----|------|-----|------|-----------|
| t6 | X+ | 0 | +Vcc | 0 | +Vcc | Xt6 = (ΔQB + ΔQT)/(TCap5), Yt6 = ΔQT/ΔQB |

Sequence 5 yields an X and a Y measurement simultaneously, which reduces errors due to ambient noise.

Accordingly, discussion of the above embodiments has been in terms of active gradients where all corners (or both ends) of electrodes are driven with known voltages to generate a gradient across a sensor. Gradients can also be generated across a sensor by passive methods. One passive method is described with respect to sensor 500 (FIG. 5) of co-pending patent application Ser. No. 11/612,799. For another example, two adjacent corners of an isotropic 4-wire resistive sensor may be driven with an AC voltage and the opposite two corners may be disconnected from any voltage source so they "float". In this case the voltage on the un-driven corners (and thus the gradient, if any, across the sensor) will depend primarily on voltage attenuation due to the series impedance across the sensor and the distributed parasitic capacitance to ground across the sensor surface, as well as capacitance of a touching implement, and the frequencies of the driving voltage. If the various sensor-related impedances and the drive signal characteristics are within a desired range, a gradient suitable for touch location may be generated across the sensor. An advantage of passive gradient systems is they may require fewer and/or lower cost circuits, and lower cost sensors.

As an example of a passive gradient system, the system 110 of FIG. 1 can be modified in accordance with the present invention. The system 110 can be used for generating passive gradients by activating only two adjacent tri-state drivers at a time. For example, a left-right gradient may be generated by activating drivers 113 and 114 with outputs of Vcc, while drivers 112 and 115 are in the high impedance state. Drivers 113 and 114 are left in the "on" state for a time period sufficient to raise the right edge of sensor 111 to near Vcc, while the left edge remains at a significantly lower level due to R-C rise time delay across the sensor. Following the time-limited pulse applied to UL and LL, drivers 113 and 114 are isolated, then switch 124 is closed, and charge on sensor 110 flows into integrator capacitor 125. This process is repeated until capacitor 125 has sufficient charge to raise $V_{Int}$ to a measurable level. This passive gradient measurement process is similar to the active gradient process described previously with respect to the system 110, except that Sequence 6 (of Table 6 below) is used with only two drivers being activated at a time and with the other two being in the off state (i.e., electrically isolated), and the "on" time of the drivers is selected to match the R-C rise time delay of sensor 110.

TABLE 6

Sequence 6

| Measurement | UL | UR | LL | LR | Calculate |
|-------------|------|------|------|------|------------|
| X+ | Off | +Vcc | Off | +Vcc | |
| X− | +Vcc | Off | +Vcc | Off | X position |
| Y+ | +Vcc | +Vcc | Off | Off | |
| Y− | Off | Off | +Vcc | +Vcc | Y position |

When used in a passive gradient system, sensor 111 preferably has surface resistivity between 300 and 30K ohms/square, and it has parasitic capacitance to ground distributed evenly across its surface.

Figure 7:
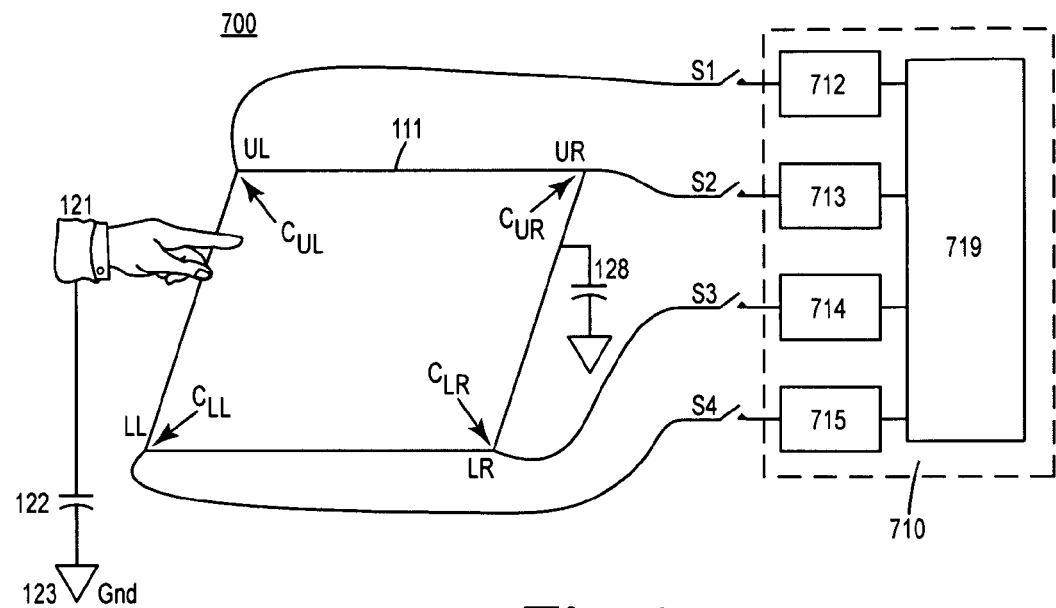
FIG. 7 illustrates another circuit arrangement for determining a contact position on a surface, also in accordance with an embodiment of the present invention.

A passive gradient mode can be implemented with reference to FIG. 7, which is based on controller 710 with capacitance-measuring signal drive circuits 712-715 known in the art, such as the circuits in 3M's EXII or SMT3 capacitive touch controller. These circuits normally apply AC voltage signals to four corners UL, UR, LR, and LL simultaneously, and they measure currents flowing into sensor 111 at each corner. Thus four equivalent sensor corner capacitances $C_{UL}$, $C_{UR}$, $C_{LR}$, and $C_{LL}$ are measured directly. Each of $C_{UL}$, $C_{UR}$, $C_{LR}$, and $C_{LL}$ have (roughly equal) portions of parasitic capacitance 128, and also a position-dependent portion of touch capacitance 122, assuming the frequency of applied signals are sufficient to generate (passive) gradients across the surface of sensor 111.

Known signal drive circuits 712-715 can be modified to perform gradient measurement with the addition of switches S1-S4 that isolate inactive signal drive circuits from sensor 111 during measurements. Assume initially that one of the (or two adjacent) circuits 712-715 becomes active and the active circuit(s) are connected to sensor 111 by closing appropriate switch(es) S1-S4. The other circuits are inactive, and they are disconnected from sensor 111 by opened switches. In this context, a single one of the driver circuits is active, and the measurement circuitry goes through a capacitance measurement sequence. The capacitance (e.g., $C_{UL}$) is measured via sensor measurement channel 712. Then each of the other three signal driver circuits in sensor measurement channels 713-715 is activated in sequence and the capacitances (e.g., $C_{UR}$, $C_{LR}$, and $C_{LL}$) are measured. A touch to the sensor surface will change the four measured capacitances, and relative changes $\Delta C_{UL}$, $\Delta C_{UR}$, $\Delta C_{LR}$, and $\Delta C_{LL}$ in these capacitances may be used to calculate touch position. Equations 21 and 22 may be used to determine a rough position, followed by scaling to match Xt, Yt to positions on a display, using known calibration methods. Error correction based on prior calibration data may be applied to correct nonlinearities in the measurement system, also using known methods.

$$Xt=(-\Delta C_{UL}-\Delta C_{LL}+\Delta C_{UR}+\Delta C_{LR})/(\Delta C_{UL}+\Delta C_{UR}+\Delta C_{LR}+\Delta C_{LL}),$$ (Equation 29)

$$Yt=(-\Delta C_{UL}+\Delta C_{LL}-\Delta C_{UR}+\Delta C_{LR})/(\Delta C_{UL}+\Delta C_{UR}+\Delta C_{LR}+\Delta C_{LL}).$$ (Equation 30)

Passive gradients are dependent on parameters of the sensor surface including parasitic capacitance magnitude and distribution, surface resistance, touch capacitance, and frequencies of operation. Sensitivity to a touch (position of an incremental capacitance due to a touch) depends on the presence of a gradient across the sensor surface. Attenuation that makes passive gradients is caused largely by R-C attenuation between the sensor sheet resistance (R) and parasitic capacitance (C). Attenuation of the applied signals causes a touch capacitance to be measured differently by the four measurement circuits, and the differences in measurement are needed to calculate a touch. For example, if the sensor surface were a copper sheet with essentially 0.0 Ohms from UL to LR, no gradient would be generated between UL and LR when UL is driven by its corresponding signal driver circuit. Thus, a 10 pf capacitance change due to a touch near LR would be measured as 10 pf with the signal driver circuit attached directly to LR, and it would also be measured as 10 pf with the same signal driver circuit attached to the opposite corner of the sensor surface. The presence of a touch is measurable, but given no difference in measurements, the position of the touch cannot be calculated. Referring to Equations 29 and 30, if $\Delta C_{UL}=\Delta C_{UR}=\Delta C_{LR}=\Delta C_{LL}=0$, the result is invalid. On the opposite end of the spectrum, if the sheet resistance of sensor were 100K ohms/square, and parasitic capacitance were 10,000 pf, evenly distributed across the sensor surface, then a typical signal of 200 KHz generated by the signal driver circuit onto corner UL would be attenuated to near zero within ¼ of the distance across the sensor surface. Thus, a touch near the middle of the sensor surface would register negligible difference at all of the four measurement circuits, due to excessive attenuation. However, if the measurement frequency were reduced from 200 KHz, a frequency could be found that would provide an optimal gradient across the 100K Ohms/square sensor surface described above. Optimal passive attenuation results in a maximum gradient difference across the full area of the sensor. For certain applications, preferably the gradient is also linear.

Figure 9:
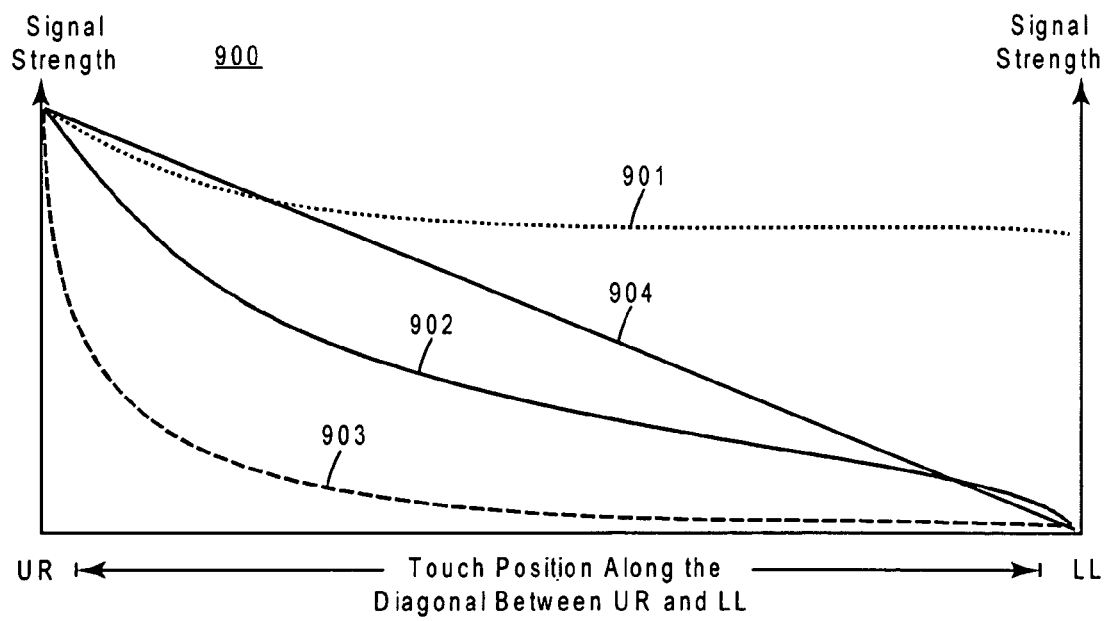
FIG. 9 illustrates a graph of signal strength versus diagonal distance across a sensor at various applied signal frequencies.

FIG. 9 shows signal strength vs. distance along a straight diagonal line from UR to LL of sensor 111 of FIG. 1. Curves 901, 902, 903, and 904 represent signal strength measured at UR, vs. distance from UR along a diagonal toward LL, during measurement of X+ or Y+ pulses. Curve 904 is ideal since it is linear and varies maximally, but this is difficult to achieve. Curve 902 is not linear but it varies maximally over the length of the sensor, yielding good measurement resolution, (signal change versus incremental distance). Curve 901 represents a less desirable signal that may be measured at UR if the frequency of measurement is too low for the impedance levels of sensor 111. A low frequency causes less R-C attenuation across the sensor. Signal 903 is also less desirable. It may be measured at UR if the frequency of operation of the controller is too high for the sensor impedance, causing too much attenuation across a small portion of the sensor near UR, and yielding low resolution across the remaining (middle and lower left) portion of sensor 111.

Some sensor impedance parameters vary with the sensor design and with its surroundings. For example, placing a sensor near a grounded chassis or placing a metal bezel over the sensor periphery will change sensor capacitance to ground. If sensor and its drive signals are matched so an adequate level of passive attenuation is achieved, touch performance may be adequate and only known calibration methods may be required. If sensor and signals do not match, one or more parameters such as frequencies of applied signals may be adjusted to achieve desired attenuation curves.

Another important aspect of the present invention is directed to methods of adjusting periods of applied signals for a specific sensor type or for a sensor type and a particular sensor mounting configuration. These approaches may be accomplished as follows: During an adjustment procedure, prior to use,
1. Operate the controller in Sequence 1 (Table 1) with applied signals having first pre-selected periods,
2. Measure signal strength ($V_{Int}$) at the sensor drive points (typically UL, UR, LL, LR corners, or at 2 ends of a linear touch sensor [slider]), while sequentially touching the sensor at selected positions (e.g. 10% inward from each corner).
3. Calculate ratios of signal strengths among various touch points, (typically ratios of signal strength between pairs of touch points near opposite edges or opposite corners of the sensor).
4. Operate the controller with applied signals having a second pre-selected period, and repeat steps 2 & 3.
5. Repeat Step 4 as required to adjust periods of applied signals such that ratios of signal strengths is sufficiently large to yield the required resolution. For example, a touch near the UR corner may preferably yield an X+ measurement that is 90% of full scale, and an X− measurement that is ~10% of the full scale signal.

The term "periods" includes periods of fundamental and harmonic frequencies of applied signals. Adjustment of periods may include, for example:
1. Adjusting the period of a pulse or sine wave,
2. Adjusting the duty cycle and/or duration of a pulse,
3. Adjusting the rise and/or fall slopes of a pulse,
4. Adjusting the resistance of a relaxation oscillator circuit,
5. Adjusting the current supplied to a relaxation oscillator circuit.

In addition to adjustment of periods, parameters such as source impedance and/or automatic gain control (AGC) may be adjusted using known methods to yield signals within an optimal measurement range.

Figure 10:
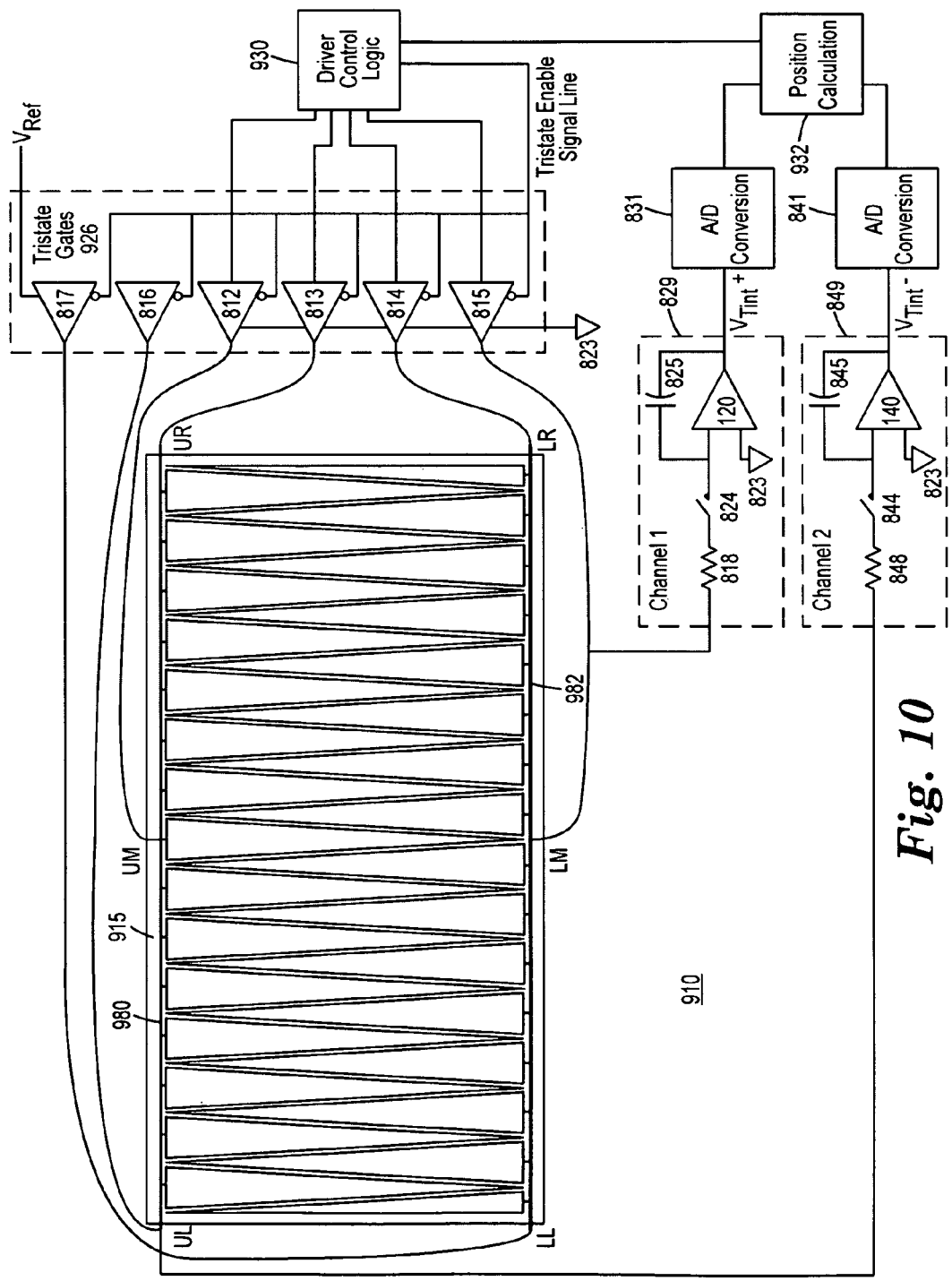
FIG. 10 illustrates yet another circuit arrangement for determining a touch position on a sensor divided into independent touch sensing segments, also in accordance aspects of the present invention.

FIG. 10 shows system 910 that is comparable to previously-discussed system 800 except that FIG. 10 includes additional tri-state drivers 816 and 817, and tri-state gates 926 drive six points on sensor 915 rather than four. Sensor 915 has been divided into two segments, including a left half and a right half. This is done by adding two additional connections from 812 and 815 to UM and LM respectively. A local gradient can be generated (horizontally) on the left half only or on the right half only, or a gradient can be generated across the whole surface. Local gradients increase the effective resolution of the system by applying the gradient in a smaller portion of the surface. Two segments are shown in system 910, though a sensor can be divided into more than two segments.

Two measurement channels are required to measure two-segment sensor 915, using driver states as shown in Table 7.

In another embodiment, UR and LR (and/or UL and LL) are connected with a resistor, and gradients are alternated vertically and horizontally, such that only one measurement circuit is used.

TABLE 7

| | | | Sequence 7 | | | | |
|---|---|---|---|---|---|---|---|
| Measurement | UL | UR | UM | LM | LL | LR | Calculate |
| TCap | +Vcc | +Vcc | +Vcc | +Vcc | +Vcc | +Vcc | Touchdown, Y position |
| X+ ALL | 0 | +Vcc | Off | Off | 0 | 0 | Rough X position |
| X+ Rt | 0 | +Vcc | 0 | 0 | 0 | +Vcc | Fine X position if touch is in right segment |

TABLE 7-continued

Sequence 7

| Measurement | UL | UR | UM | LM | LL | LR | Calculate |
|---|---|---|---|---|---|---|---|
| X– Lft | +Vcc | 0 | 0 | 0 | +Vcc | 0 | Fine X position if touch is in left segment |

In yet additional embodiments, valid locations for entering data are limited by the software applications being executed by the system and knowledge of such locations is used in ascertaining the venue of a valid touch on the sensor surface. For example, by knowing and/or controlling the valid locations, valid touch locations can be determined faster, more accurately, with less circuitry, and/or less signal processing. Assume, for example, that the software application being executed by the system is expecting the user to enter a URL in the form of selectable alphanumeric characters available by engaging keys displayed under the sensor surface. Because the sensor surface parameters (as a function of resistance) are known at these locations, the touch location system can eliminate invalid or false touches (caused by noise), e.g. in areas that are not currently touch sensitive, and arbitrate between concurrent touches on a screen. In some touch systems, the data rate of touch coordinates and/or the signal/noise ratio of touch detection can be improved by scanning only a portion of the touch screen for valid touches. In the arrangement shown in FIG. 10, for example, only one half of sensor 915 of FIG. 10 would be measured when it was known that the only valid touch areas are in the right half. Also, fewer drive circuits are needed where the whole screen area is never touchable. In some touch-location systems where battery consumption is a significant concern, fewer drive circuits and/or measurement channels are activated for software applications that so restrict valid touches.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, for those systems illustrated above with an operational-amplifier-based integrator and a switch connected to its summing junction, other capacitance measuring circuits could be used; such measuring circuits include one or more of: an integrating capacitor connected to ground, Cypress CapSense™ circuits (see, e.g., "Mobile Cap touch electronics technologies.PPT"), circuits described in co-pending patent application Ser. No. 11/612,790, 3M Company's SMT3 or EXII product, or other known ratio-of-capacitance controllers with series switches added to isolate each channel (as shown in FIG. 7), circuits described in U.S. Pat. No. 6,466,036 (Quantum), and, where only one channel is active at a time, a capacitance-to-frequency converter such as discussed in U.S. Pat. No. 4,954,823. Each of the above mentioned patent documents is fully incorporated by reference.

Examples are given pertaining to measuring position on a 2-dimensional surface. It is apparent that the circuits and methods can also be applied to measuring position on a scroll wheel or a 1-dimensional "slider".

Example circuits are simplified, and are not intended to limit alternative implementations. For example, tri-state circuits 116 controlled by logic 130 may be implemented using PIO ports controlled by a microcontroller. Measurement amplifiers 120 are referenced to ground, although alternatives such as Vcc or Vcc/2 references may be preferable in some circuits. Or, the measurement reference and drive voltages may be changed periodically, to alternate between measuring positive-going pulses and negative-going pulses. This technique can reduce the effect of low-frequency noise, as described in co-pending patent application Ser. No. 11/612,790.

Also, it will be appreciated that although specific features of the invention are shown in some drawings and not others, this is for convenience only as each feature may be combined with one or more of the other features as embraced by the teachings herein. Such modifications and changes do not depart from the true spirit and scope of the present invention, which is set forth in the following claims.

What is claimed is:

1. An apparatus for determining the position of a touching implement on the sensing surface of a device, comprising:
    a signal generation circuit, including four circuit paths arranged relative to different positions on the sensing surface and configured to be synchronously operated, to create a position-dependent electrical charge on a touching implement that has engaged an area on the sensing surface of the device; and
    a signal processing circuit, responsive to the position-dependent electrical charge, to locate the area on the sensing surface of the device by respective measurements relative to four different values from the four circuit paths, the signal processing circuit and the four circuit paths being configured and arranged to compute the position of the touching implement on the sensing surface.

2. The apparatus of claim 1, further including a switched circuit to isolate the electrical charge.

3. The apparatus of claim 1, further including a switched circuit to isolate the electrical charge and wherein the position-dependent electrical charge is generated in response to a voltage gradient that corresponds to a coordinate on the sensing surface of the device.

4. The apparatus of claim 1, wherein the signal generation circuit includes a plurality of switched drivers to create the position-dependent electrical charge, each of the plurality of switched drivers being switchable to a high-impedance state to isolate the electrical charge.

5. The apparatus of claim 4, wherein the signal processing circuit measures the electrical charge using at least one integrator, the integrator being switched to isolate the electrical charge between measurements.

6. The apparatus of claim 1, wherein the signal processing circuit measures the electrical charge using at least one integrator, the integrator being switched to isolate the electrical charge between measurements.

7. The apparatus of claim 1, wherein the signal processing circuit measures the electrical charge using an integrator, the integrator being switched to isolate the electrical charge while a position-dependent electrical charge is created on a touching implement.

8. The apparatus of claim 1, further including a processor programmed to execute an application that provides a predetermined reduced surface portion for engaging the area on the sensing surface of the device, wherein the signal processing circuit is adapted to locate the area on the sensing surface of the device as a function of the position-dependent electrical charge measured and the predetermined reduced surface portion.

9. The apparatus of claim 8, wherein the signal generation circuit is composed of less than four switching circuits for coupling charge to the surface.

10. An apparatus for determining the position of a touching implement on the sensing surface of a device, comprising:
   a signal drive circuit, coupled to the surface of the device, including four circuit paths arranged relative to different positions on the sensing surface and configured to be synchronously operated, to generate signals on the surface for creating a position-dependent electrical charge on the touching implement; and
   a charge measurement circuit, coupled to the surface of the device, to measure the position-dependent electrical charge for indicating a coordinate on the sensing surface for establishing the position of the touching implement, by respective measurements relative to four different values from the four circuit paths, the charge measurement circuit and the four circuit paths being configured and arranged to compute the position of the touching implement on the sensing surface.

11. The apparatus of claim 10, wherein non-simultaneous measurements are performed and modified using temporal interpolation prior to establishing the position of the touching implement.

12. The apparatus of claim 10, wherein the charge measurement circuit is part of circuit adapted to perform non-simultaneous measurements for calculating the position of the touching implement.

13. The apparatus of claim 10, wherein the charge measurement circuit is part of circuit adapted to perform non-simultaneous measurements for calculating the position of the touching implement, and wherein the non-simultaneous measurements are modified using temporal interpolation prior to establishing the position of the touching implement for increasing position accuracy.

14. The apparatus of claim 10, wherein the charge measurement circuit is part of circuit adapted to perform measurements of at least two measurement channels for calculating the position of the touching implement.

15. The apparatus of claim 14, wherein measurements of the measurement channels are temporally interleaved to increase position accuracy.

16. The apparatus of claim 14, wherein durations of each of multiple measurements are varied inversely with the total number of measurements in a sequence, so total measurement time remains constant as the number of measurements in a sequence is changed.

17. The apparatus of claim 14, wherein the durations of each of multiple measurements are varied inversely with the total number of measurements in a sequence, so that the total measurement time remains constant as the number of measurements in a sequence is changed.

18. The apparatus of claim 14, wherein each of the multiple measurement channels measures a different parameter, and the parameter measured by each channel is changed periodically.

19. The apparatus of claim 14, wherein each of the multiple measurement channels measures a different parameter, and parameter measurements of different channels are averaged together.

20. A method for determining the position of a touching implement on the sensing surface of a device, comprising:
   generating signals on the surface of the device, using four circuit paths arranged relative to different positions on the sensing surface, to create a position-dependent electrical charge on the touching implement; and
   measuring the position-dependent electrical charge via different values from the four circuit paths, to indicate a coordinate on the sensing surface for establishing the position of the touching implement.

21. A method for determining the position of a touching implement on a sensing surface of a touch-sensitive device, the method comprising:
   (a.) during a first time period, connecting two adjacent corners of the sensing surface to a reference voltage while maintaining the two opposite corners in a floating state disconnected from any voltage source, the first time period being sufficient to raise the potential of the sensing surface edge between the two adjacent corners to a level at or near the reference voltage while the potential of the sensing surface edge between the two opposite corners remains at a level lower than the reference voltage commensurate with an R-C time constant delay across the sensing surface; and
   (b) at the end of the first time period, disconnecting the two adjacent corners from the reference voltage, and connecting the sensing surface to an integrator capacitor for a second time period sufficient for the integrator capacitor to accumulate the charge from the sensing surface;
   (c) repeating steps (a) and (b) to accumulate sufficient charge in the integrator capacitor for measurement, and in response thereto measuring the charge stored in the integrator capacitor.

22. The method of claim 21, further comprising repeating steps (a) through (c) for each of the four pairs of adjacent corners of the sensing surface, resulting in four charge measurements each associated with a different sensing surface edge.

23. The method of claim 22, further comprising calculating the position of the touching implement on the sensing surface using the four charge measurements.

24. The method of claim 21, further comprising adjusting the first and second time periods so that the measured charge falls within a selected range for a touching implement positioned in a known location on the sensing surface.

25. The method of claim 24, further comprising repeating steps (a) through (c) and the adjusting step for each of the four pairs of adjacent corners of the sensing surface.

* * * * *